United States Patent
Lin

(10) Patent No.: US 12,501,846 B2
(45) Date of Patent: Dec. 23, 2025

(54) AUTOMATIC PRECISE PNEUMATIC PLUG TRAY SEEDER DEVICE

(71) Applicant: National Chung Hsing University, Taichung (TW)

(72) Inventor: Hao-Ting Lin, Taichung (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 476 days.

(21) Appl. No.: 18/132,605

(22) Filed: Apr. 10, 2023

(65) Prior Publication Data

US 2024/0206370 A1    Jun. 27, 2024

(30) Foreign Application Priority Data

Dec. 21, 2022 (TW) .................................. 111149270

(51) Int. Cl.
*A01C 11/02* (2006.01)
*A01C 5/04* (2006.01)
*A01C 7/04* (2006.01)

(52) U.S. Cl.
CPC ................ *A01C 7/042* (2013.01); *A01C 5/04* (2013.01)

(58) Field of Classification Search
CPC .......... A01C 7/042; A01C 5/04; A01C 11/025
See application file for complete search history.

(56) References Cited

U.S. PATENT DOCUMENTS

| | | | | | |
|---|---|---|---|---|---|
| 4,947,579 | A * | 8/1990 | Harrison | ................ | A01G 9/086 47/1.01 R |
| 5,215,550 | A * | 6/1993 | Tesch, Jr. | ............. | A01C 11/025 111/104 |
| 5,255,618 | A * | 10/1993 | Berry | ..................... | A01G 9/085 53/247 |
| 5,644,999 | A * | 7/1997 | Williames | ............ | A01C 11/025 111/105 |
| 5,676,072 | A * | 10/1997 | Williames | ............ | A01C 11/025 414/404 |
| 5,765,491 | A * | 6/1998 | Brower | ................ | A01C 11/025 111/105 |
| 5,784,984 | A * | 7/1998 | Mikawa | ............... | A01G 9/0299 111/105 |
| 5,842,306 | A * | 12/1998 | Onosaka | ................ | A01G 9/086 47/1.01 R |
| 6,044,778 | A * | 4/2000 | Shokaku | .............. | A01C 11/025 111/105 |
| 7,051,475 | B1 * | 5/2006 | Sena | ..................... | A01C 11/025 111/105 |
| 11,172,603 | B2 * | 11/2021 | Hu | ........................ | A01C 11/025 |
| 11,259,458 | B2 * | 3/2022 | Hu | ........................ | A01C 11/025 |
| 11,350,560 | B1 * | 6/2022 | Buell | .................... | A01C 11/025 |

(Continued)

FOREIGN PATENT DOCUMENTS

CN        110337862 A     10/2019

*Primary Examiner* — Jamie L McGowan
(74) *Attorney, Agent, or Firm* — MUNCY, GEISSLER, OLDS & LOWE, P.C.

(57) ABSTRACT

An automatic precise pneumatic plug tray seedling device comprises a body, a plug tray platform, a seed groove, an air pressure source, a control device, a conveyor device, a soil punching device, and a seed device. To become an automatic control of a closed loop of a pneumatic cylinder, it adjusts the input control signals through the track positioning control in the control device and the feedback signal conveyed by the conveyor device.

10 Claims, 5 Drawing Sheets

(56) References Cited

U.S. PATENT DOCUMENTS

| | | | | |
|---|---|---|---|---|
| 2002/0043195 | A1* | 4/2002 | Williames | A01C 11/025 |
| | | | | 111/105 |
| 2003/0029087 | A1* | 2/2003 | Tagawa | A01G 9/086 |
| | | | | 47/87 |
| 2017/0265378 | A1* | 9/2017 | Aikala | A01C 11/02 |
| 2020/0120860 | A1* | 4/2020 | Hu | A01C 11/025 |
| 2020/0260636 | A1* | 8/2020 | Ito | A01C 11/00 |
| 2020/0375089 | A1* | 12/2020 | Crouse | A01C 11/025 |
| 2021/0015027 | A1* | 1/2021 | Moiddin | A01C 11/006 |
| 2021/0329830 | A1* | 10/2021 | Hu | A01C 11/025 |
| 2021/0329831 | A1* | 10/2021 | Hu | A01C 11/025 |
| 2024/0206370 | A1* | 6/2024 | Lin | A01C 7/042 |
| 2024/0315164 | A1* | 9/2024 | Buell | A01C 11/006 |

\* cited by examiner

AUTOMATIC PRECISE PNEUMATIC PLUG TRAY SEEDER DEVICE

CROSS-REFERENCE TO RELATED APPLICATIONS

This non-provisional application claims priority under 35 U.S.C. § 119(a) on Patent Application No(s). 111149270 filed in Taiwan, on Dec. 21, 2022, the entire contents of which are hereby incorporated by reference.

TECHNICAL FIELD

The present invention relates to an automatic precise pneumatic plug tray seedling device, a seeder that particularly utilizes the pressure of compressed air generated by an air pressure system to be a drive, and an air pressure type hole board automated seeding device that is structurally simple, low-cost, highly safe and significantly improves the control precision.

BACKGROUND

The use of plug trays for seedling cultivation has a long history in our country, with vegetable crops being the most common. Cultivating seedlings in plug trays allows for centralized management, thus reducing the time needed for field cultivation and the risk of cultivation failure. However, the majority of seedling cultivation fields operators are middle-aged or elder, and younger people are less to be involved in this type of work. As a result, the labor force is becoming a major challenge in the seedling cultivation industry, making automation of seedling production is imperative.

In order to solve the workforce problem, currently, seedling production automation mainly uses motors to drive the seeder and then cooperates with plug trays to achieve automation. However, motors have the problems of high noise and severe vibration, and when the load of the plug tray increases; the driving speed of the motor will decrease, resulting in a high failure rate of automatic seeding. Therefore, seeders driven by motors have problem on discontinuous motion. Therefore, how to improve discontinuous motion of automated seeders is one of the urgent problems needed to be solved by the academic and industrial circles.

SUMMARY

The disclosure provides an automatic precise pneumatic plug tray seeder device that solves the problem of driving with motors. The present invention uses the pressure of compressed air generated by the pneumatic system as the driving source of the seeder. Compared to driving by using motors, the pneumatic system has a simple structure, low cost, high safety, and can effectively improve the control precision, which greatly reduces the seeding failure rate of the seeder.

The embodiment of the present invention disclosed in the automatic precise pneumatic plug tray seedling device includes a body, a plug tray platform, a seed groove, an air pressure source, a control device, a conveyor device, a soil punching device and a seed device. The body has an upper surface and a lower surface; the plug tray platform is arranged on the upper surface of the body for moving the plug tray, and the plug tray has multiple grid patterned grooves, all of which are filled with soil; the seed groove contains multiple seeds; the air pressure source is used to provide high-pressure gas; the control device provides a preset cylinder position value, and calculates a corresponding control value according to the cylinder position value, and then outputs a first control signal; the conveyor device drives the movement of the plug tray platform, receives the high-pressure gas of the air pressure source and the first control signal of the control device, and adjusts the flow and direction of the high-pressure gas according to the first control signal, and then sends a feedback signal to the control device, so that the control device can adjust the first control signal according to the feedback signal and the track positioning control; the soil punching device is installed above the plug tray and is connected to a punching machine, and the soil punching device receives high-pressure gas from the air pressure source to drive the movement of the punching machine. The seed device is installed above the plug tray platform and is connected to a seed needle, and the seed device receives high-pressure gas from the air pressure source to drive the movement of the seed needle and activate the suction of the seed needle. When the plug tray moves to below the soil punching device, the control device outputs a second control signal through the trajectory positioning control to adjust the high-pressure gas entering the soil punching device, in order to move the soil in the grid patterned grooves of the plug tray, and then the punching machine will punch the soil. When the plug tray moves to below the seed device, the control device further outputs a third control signal and a fourth control signal through the trajectory positioning control, using the third control signal to adjust the high-pressure gas entering the seed device, in order to move the seed needle into the seed groove, and then using the fourth control signal to control the seed needle to adsorb or place the seed. The trajectory positioning control is established by using a trajectory tracking error to establish a fractional-order sliding plane and combining a state equation, to obtain an equation of input control.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
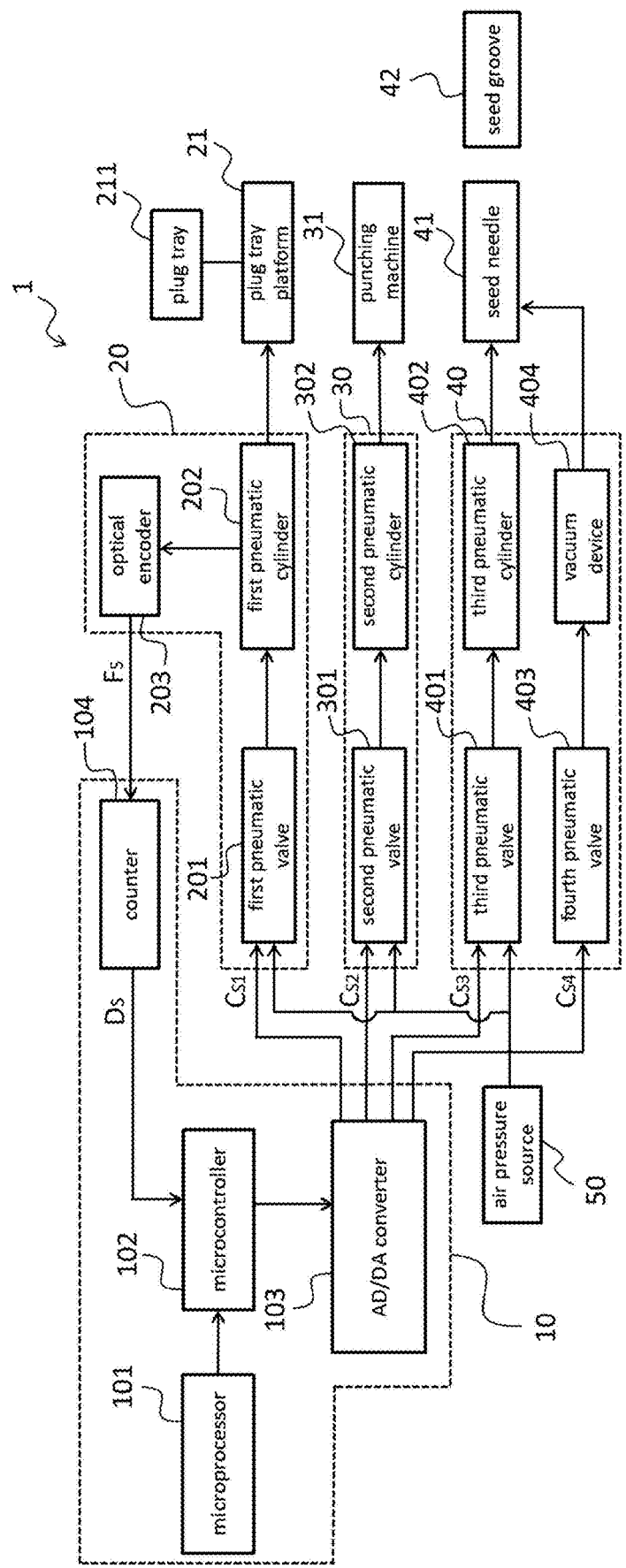
FIG. 1 is a schematic view of the structure of the automatic precise pneumatic plug tray seedling device of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
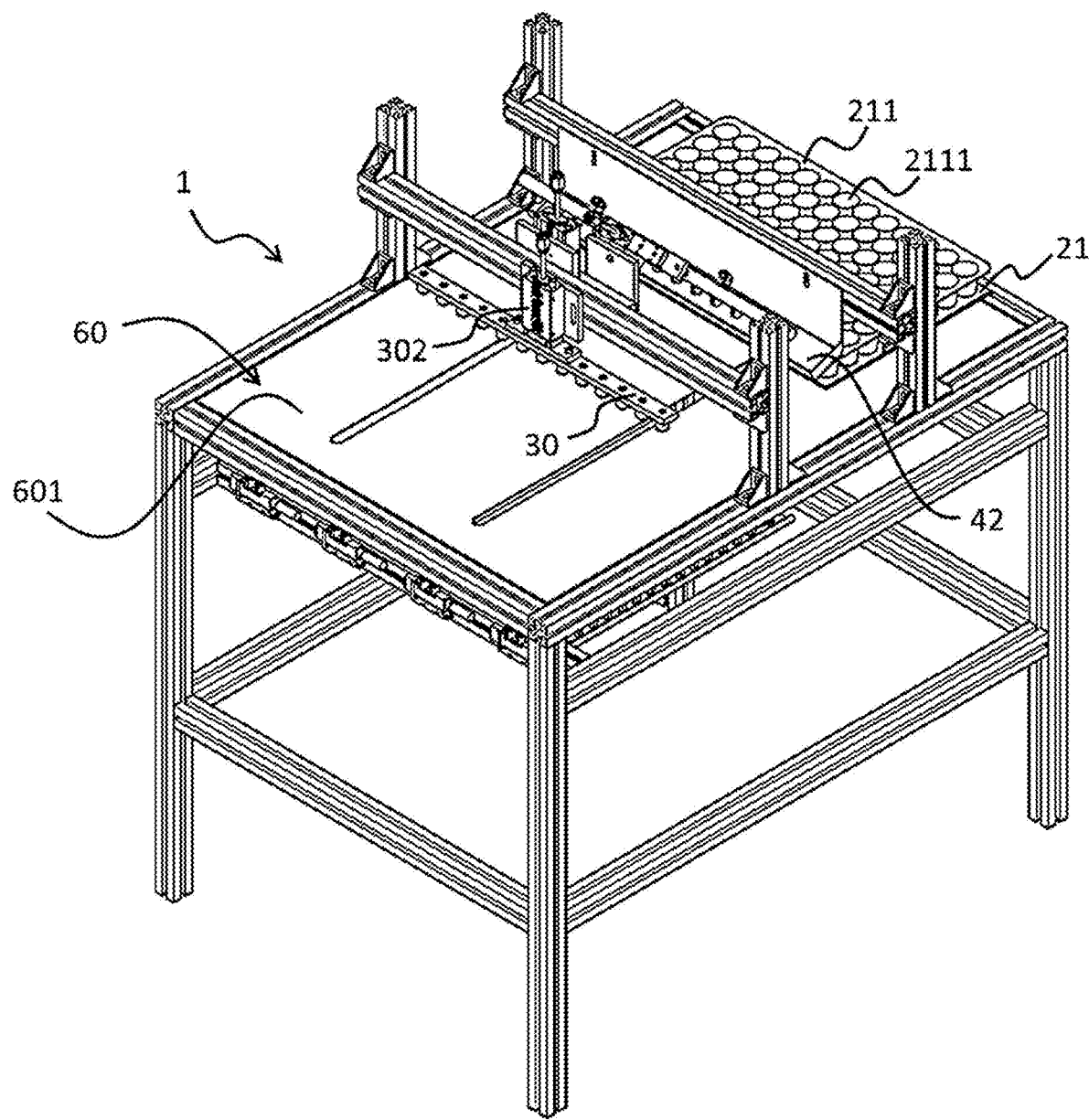
FIG. 2 is a top perspective view of the left side of the body of the automatic precise pneumatic plug tray seedling device according to the embodiment of the present invention.
Figure 3:
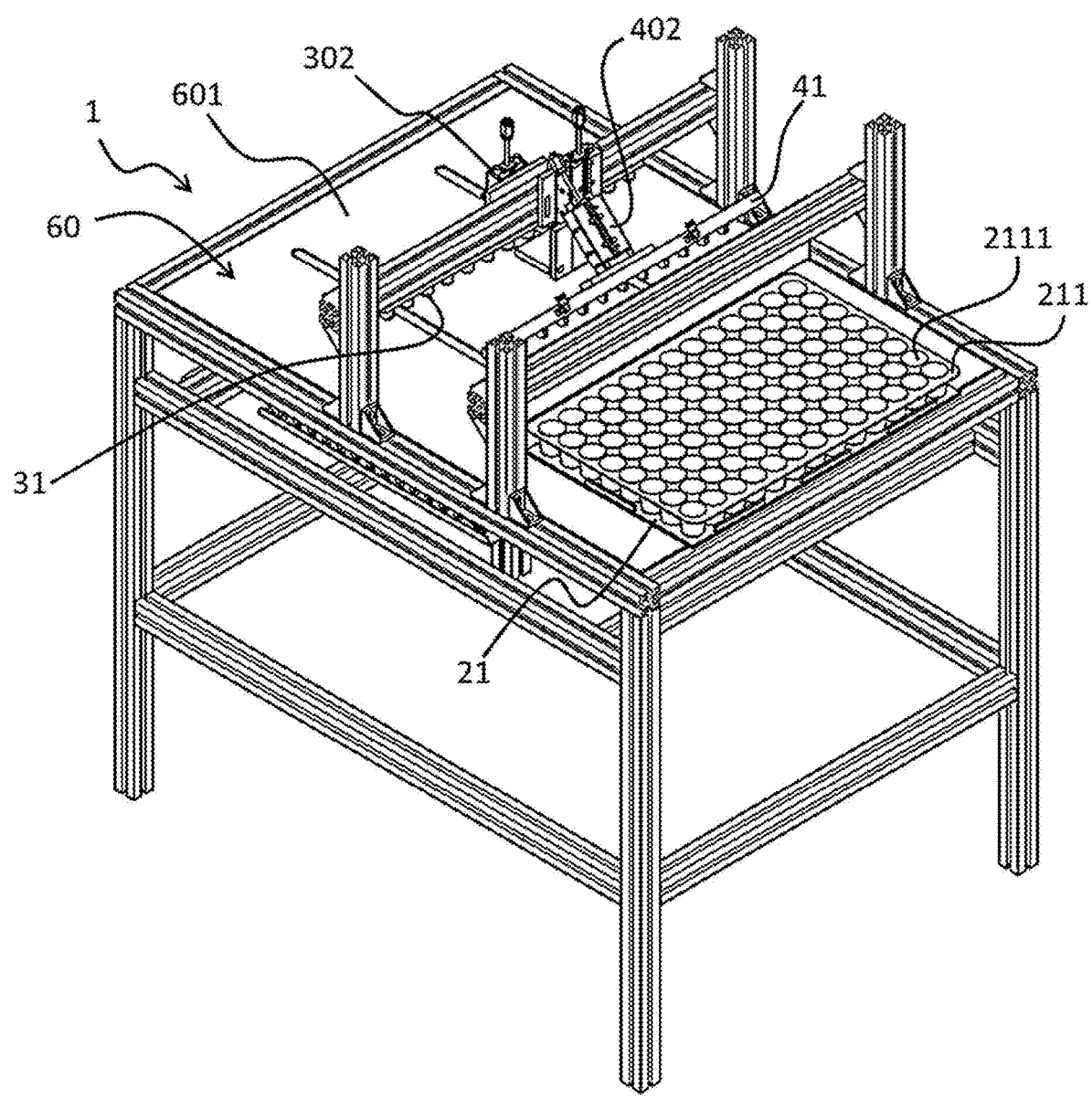
FIG. 3 is a top perspective view of the right side of the body of the automatic precise pneumatic plug tray seedling device according to the embodiment of the present invention.
Figure 4:
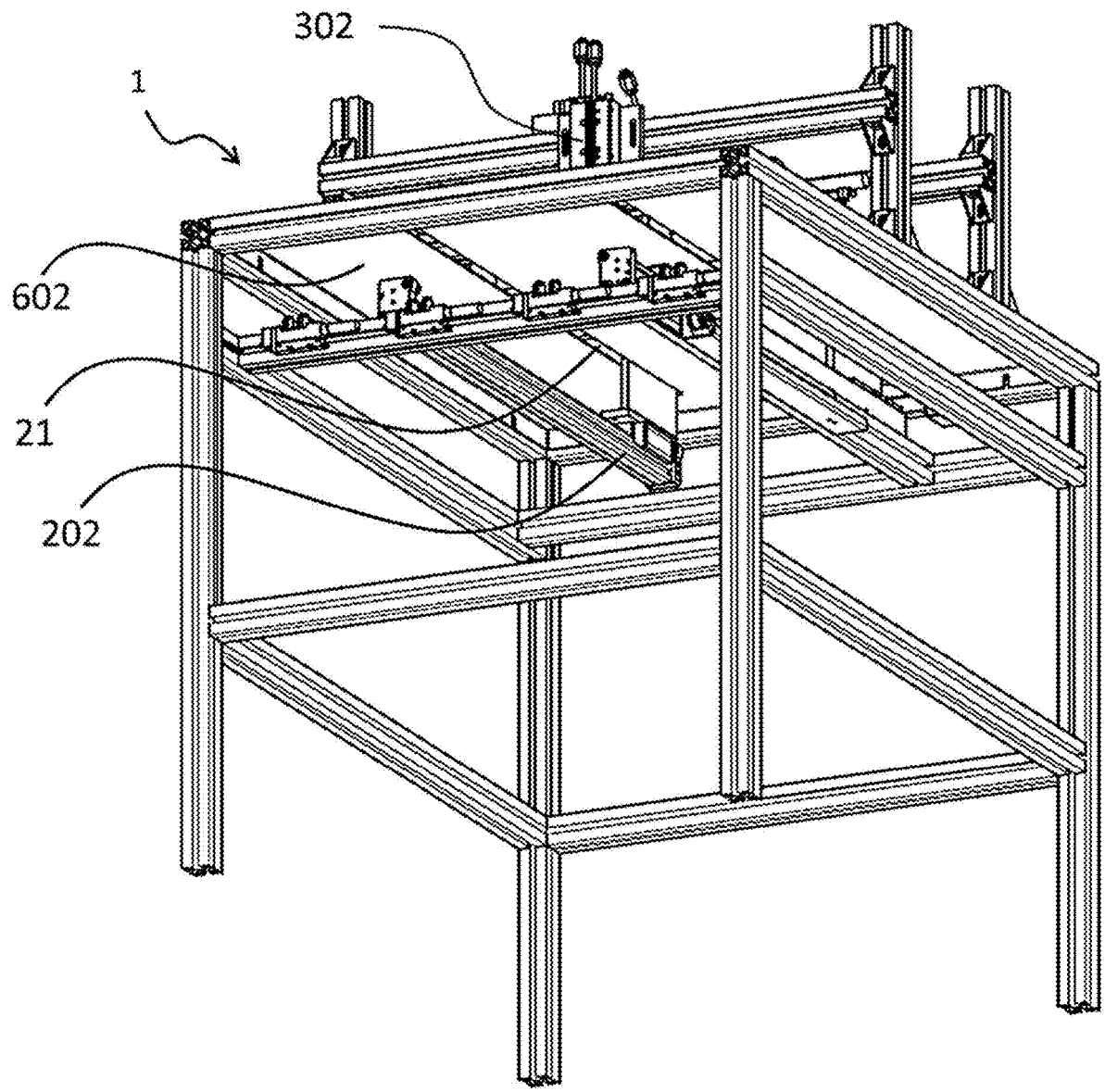
FIG. 4 is a bottom perspective view of the body of the automatic precise pneumatic plug tray seedling device according to the embodiment of the present invention.

Please refer to FIG. 1, which is a perspective view of a vapor chamber 10 in accordance with the first embodiment of the disclosure. Please refer to FIG. 1, FIG. 2, FIG. 3, and FIG. 4 simultaneously. FIG. 1 is a schematic view of the automatic precise pneumatic plug tray seedling device described in this embodiment of the invention. FIG. 2 is a left side plan view of the body of the automatic precise pneumatic plug tray seedling device described in this embodiment of the invention. FIG. 3 is a right side plan view of the body of the automatic precise pneumatic plug tray seedling device described in this embodiment of the invention. FIG. 4 is an overhead view of the body of the automatic precise pneumatic plug tray seedling device described in this embodiment of the invention.

The automatic precise pneumatic plug tray seedling device 1 of this embodiment includes a control device 10, a conveyor device 20, a plug tray platform 21, a plug tray 211, a soil punching device 30, a punching machine 31, a seed device 40, a seed needle 41, a seed groove 42, an air pressure source 50, and a body 60. The body 60 is a working platform with an upper surface 601 and a lower surface 602. The control device 10 and the conveyor device 20 are located below the lower surface 602 of the body 60. The plug tray platform 21 is located on the upper surface 601 of the body 60, and the upper surface of the plug tray platform 21 is where the plug tray 211 is placed. The plug tray 211 has multiple grid patterned grooves 2111 filled with soil. The soil punching device 30, punching machine 31, seed device 40, and seed needle 41 are located above the upper surface 601 of the body 60. The seed groove 42 is located on the opposite side of the seed device 40 and seed needle 41, and contains multiple seeds. The air pressure source 50 is installed next to or below the lower surface 602 of the body 60 depending on its size.

In this embodiment, the control device 10 is connected to the conveyor device 20, soil punching device 30, and the seed device 40. The conveyor device 20 is connected to the plug tray platform 21 and the air pressure source 50, the soil punching device 30 is connected to the punching machine 31 and the air pressure source 50, and the seed device 40 is connected to the seed needle 41 and the air pressure source 50.

Among them, the air pressure source 50 is used to provide high-pressure gas to the conveyor device 20, soil punching device 30 and seed device 40 as the power of displacement.

In this embodiment, the control device 10 is used to provide a preset cylinder positioning value, and to calculate the corresponding control quantity based on the cylinder positioning value, and then to output a first control signal Cs1 according to the control quantity to adjust the flow and direction of the high-pressure gas of the conveyor device 20, so that the conveyor device 20 will move in the direction of the preset cylinder positioning value. Then, the conveyor device 20 will send a feedback signal Fs back to the control device 10, allowing the control device 10 to adjust the first control signal Cs1 based on the feedback signal Fs and the track positioning control, and then send the first control signal Cs1 to the conveyor device 20, and then let the conveyor device 20 change speed and direction again based on the adjusted first control signal Cs1, making it a closed-loop automatic control of a cylinder.

When the conveyor device 20 moves according to the requirements of the control device 10, the conveyor device 20 will drive the plug tray platform 21 and the plug tray 211 to move together at the same speed and direction. When the plug tray 211 moves to the area below the soil punching device 30, the control device 10 will output a second control signal Cs2 through the track positioning control to activate the high-pressure gas flow of the soil punching device 30, causing the soil punching device 30 to drive the punching machine 31 to move the soil in the grooves of the plug tray 211, and then the punching machine 31 will perform the punching action on the soil. When the plug tray 211 moves to the area below the seed device 40, the control device 10 will output a third control signal Cs3 and a fourth control signal Cs4 simultaneously through the track positioning control, using the third control signal Cs3 to drive the seed needle 41 to move to the seed groove, and then the fourth control signal Cs4 will control the seed needle 41 to perform the action of adsorbing and placing seeds.

In this embodiment, the control device 10 includes a microprocessor 101, a microcontroller 102, an analog-to-digital/digital-to-analog converter (referred to as AD/DA converter) 103, and a counter 104. The conveyor device 20 includes a first pneumatic valve 201, a first pneumatic cylinder 202, and an optical encoder 203. The soil punching device 30 includes a second pneumatic valve 301 and a second pneumatic cylinder 302. The seed device 40 includes a third pneumatic valve 401, a third pneumatic cylinder 402, a fourth pneumatic valve 403, and a vacuum device 404.

Among them, the microprocessor 101 connects to the microcontroller 102, and the microcontroller 102 connects to the AD/DA converter 103. The AD/DA converter 103 connects to the first pneumatic valve 201, the second pneumatic valve 301, the third pneumatic valve 401 and the vacuum device 404. The first pneumatic valve 201 connects to the first pneumatic cylinder 202 and the first pneumatic cylinder 202 connects to the optical encoder 203 and plug tray platform 21. The optical encoder 203 connects to the counter 104, which in turn connects to the microcontroller 102. The second pneumatic valve 301 connects to the second pneumatic cylinder 302 and the second pneumatic cylinder 302 connects to the punching machine 31. The third pneumatic valve 401 connects to the third pneumatic cylinder 402 and the third pneumatic cylinder 402 connects to the seed needle 41. The fourth pneumatic valve 403 connects to the vacuum device 404 which in turn connects to the seed needle 41.

In this embodiment, the microprocessor 101 provides a preset cylinder positioning value to the microcontroller 102. The microcontroller 102 then calculates the corresponding control value based on the cylinder positioning value, and then outputs the first control signal Cs1 through the AD/DA converter 103 to adjust the flow and direction of high-pressure gas entering the first pneumatic valve 201, causing the first pneumatic cylinder 202 to move in accordance with the flow and direction of the high-pressure gas. The first pneumatic cylinder 202 then sends a feedback signal Fs to the counter 104 through an optical encoder 203, the counter 104 then obtains a displacement from the feedback signal Fs and converts it into a displacement signal Ds and sends it to the microcontroller 102. The microcontroller 102 then adjusts the first control signal Cs1 based on the displacement signal Ds and a trajectory positioning control and sends the first control signal Cs1 to the first pneumatic valve 201 through the AD/DA converter 103, allowing the first pneumatic valve 201 to readjust the flow and direction of high-pressure gas entering the first pneumatic valve 201, making it an automatic control of a closed-loop cylinder.

Wherein, when the first pneumatic cylinder 202 moves according to the flow and direction of high-pressure gas, it will drive the plug tray platform 21 and the plug tray 211 to move in the same speed and direction. When the plug tray 211 moves to the area below the second pneumatic valve 301 and the second pneumatic cylinder 302, the microcontroller 102 will output a second control signal Cs2 through the trajectory positioning control to activate the flow and direction of high-pressure gas in the second pneumatic valve 301, making the second pneumatic cylinder 302 move the soil in the grid patterned groove of the plug tray 211 through the punching machine 31. Then, the punching machine 31 will perform the hole punching action. Similarly, when the plug tray platform 21 moves to the area below the third pneumatic valve 401 and the third pneumatic cylinder 402, the microcontroller 102 will output the third control signal Cs3 and the fourth control signal Cs4 simultaneously. Using the third control signal Cs3 to start the flow and direction of high-pressure gas in the third pneumatic valve 401, making the third pneumatic cylinder 402 drive the seed needle 41 to move. And the fourth control signal Cs4 is used to open or close the operation of the fourth pneumatic valve 403, controlling the start or stop of the vacuum device 404 through.

In this embodiment, the first pneumatic valve 201, the second pneumatic valve 301 and the third pneumatic valve 401 are pressure proportional valves, but this is not limiting and other pneumatic components can also be used according to different requirements, such as flow proportional valves, solenoid valves, etc.

In this embodiment, the fourth pneumatic valve 403 is an electromagnetic pressure switch valve, but this is not limiting, and other switch valves can also be used according to different requirements, such as ISO solenoid valves, vacuum solenoid valves, etc.

In this embodiment, the first pneumatic cylinder 202 is a rodless pressure cylinder, and the second pneumatic cylinder 302 and the third pneumatic cylinder 402 are rod-type pneumatic cylinders, but this is not limiting and other pneumatic cylinders can also be used according to different requirements, such as single-acting pneumatic cylinders, double-acting pneumatic cylinders, etc.

In this embodiment, the seed groove 42 has a total of 104 grid patterned grooves, and the diameter of each grid patterned groove is 42 mm. However, this is not limited, and the number and diameter of the grid patterned grooves can also be adjusted according to different needs.

Figure 5:
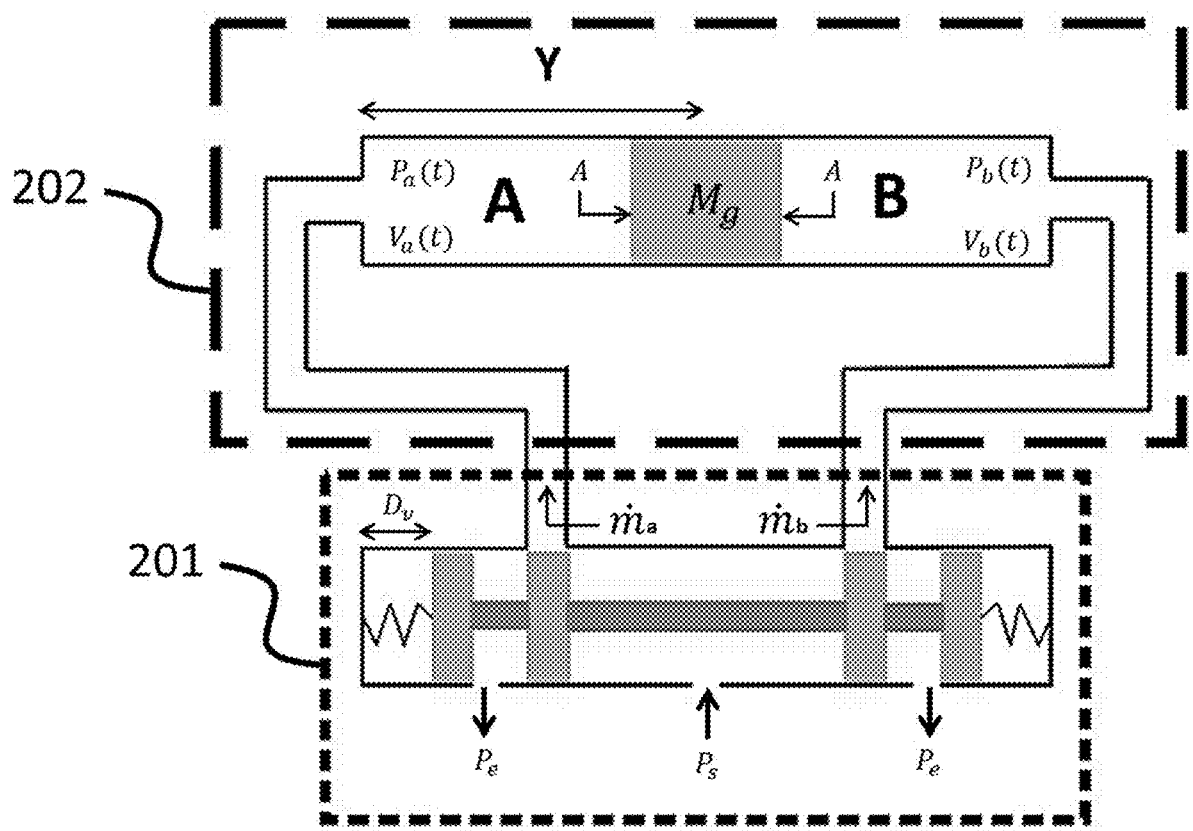
FIG. 5 is a schematic view of a model of a pneumatic system composed of a first pneumatic valve and a first pneumatic cylinder according to an embodiment of the present invention.

Please refer to FIG. 5, which is a model illustration of the pneumatic system composed of the first pneumatic valve and the first pneumatic cylinder in this embodiment of the invention.

The first pneumatic valve 201 is a pressure proportion valve, the first pneumatic cylinder 202 is a rodless pressure cylinder, and the mathematical model of the pressure system composed of the two can be divided into four parts: a mathematical model equation of the first pneumatic valve 201, a mass flow rate equation inside the second pneumatic cylinder 302, a fluid continuity equation of the second pneumatic cylinder 302 and a motion equation of the second pneumatic cylinder 302, and based on the above four parts of the mathematical model, the state equation of the pressure system can be obtained, the equation is as follows:

$$\begin{bmatrix} \dot{x}_1(t) \\ \dot{x}_2(t) \\ \dot{x}_3(t) \\ \dot{x}_4(t) \end{bmatrix} = \begin{bmatrix} x_2(t) \\ \dfrac{(Ax_3(t) - Ax_4(t))\operatorname{sgn}(x_2(t)) - K_f x_2(t) - K_c(x_1(t)) - Mg}{M} \\ \dfrac{-kx_2(t)x_3(t)}{x_1(t) + \Delta} + \dfrac{kRT_s C_d C_0 wu(t)\hat{f}(x_3(t), P_s(t), P_e(t))}{A(x_1(t) + \Delta)} \\ \dfrac{kx_2(t)x_4(t)}{l - x_1(t) + \Delta} + \dfrac{kRT_s C_d C_0 wu(t)\hat{f}(x_4(t), P_s(t), P_e(t))}{A(l - x_1(t) + \Delta)} \end{bmatrix}$$

Where A is the piston cross-sectional area of the rodless cylinder, l is the total stroke of the rodless cylinder, $\Delta$ is the small displacement of the piston movement of the rodless cylinder, and w is the width of the hole. In addition, $x_1(t)=x(t)$ represents the piston displacement of the rodless pneumatic cylinder, $x_2(t)=\dot{x}(t)$ represents the speed of movement of the piston of the rodless pneumatic cylinder, $x_3(t)=P_a(t)$ represents is the A chamber pressure of the rodless pneumatic cylinder, and $x_4(t)=P_b(t)$ represents the B chamber pressure of the rodless pneumatic cylinder. Where $K_f$ is the coefficient of viscous friction, $K_c$ is the coefficient of Coulomb friction, M is the total load mass of the rodless cylinder, including the piston, plug tray, soil and seeds, with a total of about 2 kg, x(t) is the displacement of the piston of the rodless pneumatic cylinder. k=1.4 is the specific heat constant, R=287 J/(kg·K) is the ideal gas coefficient. $C_d$=0.8 is the displacement coefficient, $C_o$ is the mass flow rate parameter, u(t) is the control input, $P_s(t)=6\times10^5$ $P_a$ is the supply pressure, $P_e(t)=1\times10^5$ Pa is the external pressure, $T_s$=293 K is the supply temperature.

Where the mathematical model of the first pneumatic valve is used to describe the relationship between the control input voltage and the position of the internal valve stem of the first pneumatic. The model can be represented as a zero-order, first-order, or second-order model. However, since the natural frequency of the first pneumatic valve 201 is much higher than the natural frequency of the second pneumatic cylinder 302, the mathematical model of the first pneumatic valve 201 is represented as a zero-order, with the equation as shown in equation (1):

$$A_o(t) = KD_v(t) \tag{1}$$

Wherein $A_o(t)$ is the opening area of the first pneumatic valve, K is the gain value, $D_v(t)$ is the displacement of the internal valve stem.

Wherein the mass flow rate equation of the second pneumatic cylinder 302 is as shown in equations (2), (3) and (4):

$$\dot{m}(t) = \dfrac{C_d C_o A_o(t) P_u(t) \hat{f}\left(\dfrac{P_d(t)}{P_u(t)}\right)}{\sqrt{T_u}} \tag{2}$$

$$\hat{f}(P_a(t), P_s(t), P_e(t)) = \begin{cases} \dfrac{P_s(t)\hat{f}\left(\dfrac{\bar{P}_a(t)}{P_s(t)}\right)}{\sqrt{T_s}} & A \text{ is the drive chamber} \\ \dfrac{P_a(t)\hat{f}\left(\dfrac{P_e(t)}{P_a(t)}\right)}{\sqrt{T_a}} & B \text{ is the drive chamber} \end{cases} \tag{3}$$

$$\hat{f}(P_b(t), P_s(t), P_e(t)) = \begin{cases} \dfrac{P_s(t)\hat{f}\left(\dfrac{P_b(t)}{P_s(t)}\right)}{\sqrt{T_s}} & B \text{ is the drive chamber} \\ \dfrac{P_b(t)\hat{f}\left(\dfrac{P_e(t)}{P_b(t)}\right)}{\sqrt{T_b}} & A \text{ is the drive chamber} \end{cases} \quad (4)$$

Wherein $\dot{m}(t)$ is the mass flow rate, $C_d=0.8$ is the discharge coefficient, $C_o$ is the mass flow rate parameter, $A_o(t)$ is the opening area of the first pneumatic valve, $P_u(t)$ is the upper layer pressure, $P_d(t)$ is the lower layer pressure, $P_s(t)=6\times10^5$ Pa is the supply pressure, $P_e(t)=1\times10^5$ Pa is the external pressure, $P_a(t)$ and $P_b(t)$ are the pressures inside the chambers, $T_u$ is the upper layer temperature, $T_s=T_a=T_b=293K$ are supply air temperature and temperatures of chambers A and B.

Wherein the fluid continuity equation of the second pneumatic cylinder 302 is as shown in equations (5) and (6):

$$\dot{m}_a(t) = \frac{\dot{P}_a(t)V_a(t)}{kRT_s} + \frac{\dot{V}_a(t)P_a(t)}{RT_s} \quad (5)$$

$$\dot{m}_b(t) = \frac{\dot{P}_b(t)V_b(t)}{kRT_s} + \frac{\dot{V}_b(t)P_b(t)}{RT_s} \quad (6)$$

Wherein $\dot{m}_a(t)$ and $\dot{m}_b(t)$ are the mass flow rates of chambers A and B, $k=1.4$ is the specific heat constant, $R=287$ J/(kg·K) is the ideal gas constant, $T_s=293K$ is the supplied air temperature, $V_a(t)$ and $V_b(t)$ are the volumes of chambers A and B, $P_a(t)$ and $P_b(t)$ are the pressures inside the chambers.

Wherein the motion equation of the air cylinder within the second pneumatic cylinder 302 is shown in the following (7):

$$(AP_a(t) - AP_b(t))\mathrm{sgn}(x(t)) - \quad (7)$$
$$K_f \dot{x}(t) - K_c(x(t))\mathrm{sgn}(\dot{x}(t), P_a(t), P_b(t)) - Mg = M\ddot{x}(t)$$

Wherein A is the piston cross-sectional area, $P_a(t)$, $P_b(t)$ are the pressures inside the chamber, $K_f$ is the coefficient of viscous friction, $K_c$ is the coefficient of Coulomb friction, $x(t)$ is displacements of the pneumatic cylinder, Mg is the piston load of the pneumatic cylinder (including the piston, plug tray, soil, and seeds, which is about 2 kilograms in total).

In this embodiment, the microcontroller 102 first establishes a dynamic model of the air pressure system, the dynamic model uses an orthogonal function to expand any function $f(t)$ that falls within the interval $[t_1, t_2]$, and then uses a Fourier series as the orthogonal function, and confirms whether there is any function $f(t)$ that satisfies the Dirichlet condition within the interval $[t_1, t_2]$ and expands it into the equation shown in the following (8):

$$f(t) = a_0 + \sum_{n=1}^{\infty} [a_n \cos nt + b_n \sin nt] \quad (8)$$

Wherein
$$\begin{cases} a_0 = \dfrac{1}{2\pi}\int_{-\pi}^{\pi} f(t)dt \\ a_n = \dfrac{1}{\pi}\int_{-\pi}^{\pi} f(T)\cos nt dT \\ b_n = \dfrac{1}{\pi}\int_{-\pi}^{\pi} f(T)\sin nt dT \end{cases}$$

Wherein $a_0$, $a_n$ and $b_n$ are the coefficients of the Fourier series, $n=1, 2, \ldots$.

Wherein $t_1$ of the interval $[t_1, t_2]$ is the initial time, and $t_2$ is the final time.

The function $f(t)$ that satisfies the Dirichlet conditions can be written as the following equation (9):

$$f(t) = \sum_{i=1}^{n} w_i z_i(t) + \epsilon(t) \quad (9)$$

Wherein $\epsilon(t)$ represents the truncation error.

If n is large enough in the equation (9) above, then $\epsilon(t)$ can be ignored. Therefore, any function $f(t)$ can be approximately represented as the product of a coefficient vector and an orthogonal function vector, as shown in the following equation (10):

$$f(t) \approx wz(t) \quad (10)$$

Wherein $w = [w_1 w_2 \ldots w_n]$ $z(t) = [z_1(t) z_2(t) \ldots z_n(t)]^T$

Wherein w is the coefficient vector, z(t) is the orthogonal function vector.

Then, in order to ensure that the pressure system in this embodiment has a system output y(t), a reference trajectory $y_m(t)$ is used as the control target, and a trajectory tracking error e(t) is generated. The equation of the trajectory tracking error e(t) is as follows (11):

$$e(t) = y_m(t) - y(t) \quad (11)$$

A sliding plane is established based on the trajectory tracking error e(t), and the equation of the fractional-order sliding plane is as follows (12):

$$s = a_1 e(t) + a_2 D^\mu e(t) + \dot{e}(t) \quad (12)$$

Where $a_1$ and $a_2$ are sliding plane parameters, and μ is a real number, $D^\mu$ is a differential operator symbol, which can be represented as:

$$D^\mu f(t) = \begin{cases} \dfrac{d^\mu}{dt^\mu} f(t) & \mu > 0 \\ f(t) & \mu = 0 \\ \int f(t)(dt)^{-\mu} & \mu < 0 \end{cases}$$

In this embodiment, the fractional-order sliding plane is combined with the state equation of the pressure system, so that the microcontroller 102 can obtain a control input equation. When $\mu=1.5$, the control input equation (13) of the microcontroller 102 is as follows:

$$u(t) = \frac{-\widehat{W_F}^T z_F(t) - e(t) - a_1 D^\mu e(t) - a_2 \ddot{e}(t) - p_{21} e(t) - p_{22} D^\mu e(t) + \ddot{y}_m(t) - \frac{s}{2\rho^2}}{\widehat{W_G}^T z_G(t)} \quad (13)$$

Wherein $\widehat{W_F}$, $\widehat{W_G}$ are weight matrices, $z_F(t)$, $z_G(t)$ are orthogonal functions, T is transpose, $e(t)$ is the trajectory tracking error, $a_1$ and $a_2$ are sliding plane parameters, $p_{21}$ and $p_{22}$ are elements of positive definite symmetric matrix P, $\rho$ is a natural number, and s is the fractional order sliding plane.

The positive definite symmetric matrix P satisfies the condition of $$A = \begin{bmatrix} 0 & 1 \\ a1 & a2 \end{bmatrix}, A^T P + PA = -Q, Q = \begin{bmatrix} 1 & 2 \\ 2 & 5 \end{bmatrix}$$

Wherein A is a constant lower triangular matrix, T is transpose, Q is a positive definite matrix, and −Q is a negative definite matrix.

In this embodiment, the microcontroller 102 can obtain the control input signal according to equation (13), and finally the control input signal is output through the first pneumatic valve 201 and the first pneumatic cylinder 202.

As can be clearly understood from the above explanation of the dynamic model of the pressure system in this embodiment of the present invention, the trajectory positioning control in the microcontroller 102 is to use a trajectory tracking error $e(t)$ to establish a fractional-order sliding plane s, and then combine it with a state equation to obtain an input control $u(t)$ equation.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An automatic precise pneumatic plug tray seedling device, comprising:
   a body having an upper surface and a lower surface;
   a plug tray platform, arranged on the upper surface of the body, for placing a plug tray on the plug tray platform for movement, and the plug tray having multiple grid patterned grooves, each of which is filled with soil;
   a seed groove for placing multiple seeds;
   an air pressure source for providing high-pressure gas;
   a control device for providing a preset cylinder position value and calculating the corresponding control value based on the cylinder position value, and outputting a first control signal;
   a conveyor device for driving the movement of the plug tray platform and the plug tray, and receiving the high-pressure gas from the air pressure source and the first control signal from the control device, and adjusting the flow and direction of the high-pressure gas according to the first control signal, and then sending a feedback signal to the control device, allowing the control device to adjust the first control signal based on the feedback signal and a track positioning control;
   a soil punching device, the soil punching device is arranged above the plug tray and connected to a punching machine, and the soil punching device will receive high-pressure gas from the air pressure source to drive the movement of the punching machine;
   a seed device, which is arranged above the plug tray platform and connected to a seed needle, and receives seeds from the seed groove and uses high-pressure gas from the air pressure source to drive the movement of the seed needle and activate a suction of the seed needle;
   Wherein, when the plug tray moves below the soil punching device, the control device will output a second control signal through the trajectory positioning control to adjust the high-pressure gas entering the soil punching device to drive the soil punching machine to move to the soil in the grid patterned grooves in the plug tray, and then the punching machine punches the soil;
   when the plug tray moves to the bottom of the seed device, the control device then simultaneously outputs a third control signal and a fourth control signal through the trajectory positioning control, and uses the third control signal to adjust the high-pressure gas entering the seeding device to drive the seed needle on the seed device move into the seed groove, and then use the fourth control signal to control the seed needle to adsorb or place seeds;
   Wherein the trajectory positioning control is to use a trajectory tracking error to establish a fractional order sliding plane, and then combine with a state equation to obtain an input control equation.

2. The automatic precise pneumatic plug tray seedling device according to claim 1, wherein the equation for the trajectory tracking error is: $(t)=y_m(t)-y(t)$, where $y(t)$ is the system output and $y_m(t)$ is the reference trajectory.

3. The automatic precise pneumatic plug tray seedling device according to claim 1, wherein the equation for the fractional order sliding plane is: $s=a_1 e(t)+a_2 D^\mu e(t)+\ddot{e}(t)$, wherein $a_1$ and $a_2$ are sliding plane parameters, $\mu$ is a real number, and $D^\mu$ is a differential operator symbol.

4. The automatic precise pneumatic plug tray seedling device according to claim 1, wherein the state equation is derived based on a mathematical model equation of a first pneumatic valve of an air pressure system, a mass flow rate equation of a second pneumatic cylinder, a fluid continuity equation of the second pneumatic cylinder, and a motion equation of the second pneumatic cylinder.

5. The automatic precise pneumatic plug tray seedling device according to claim 4, wherein the state equation is:

$$\begin{bmatrix} \dot{x}_1(t) \\ \dot{x}_2(t) \\ \dot{x}_3(t) \\ \dot{x}_4(t) \end{bmatrix} = \begin{bmatrix} x_2(t) \\ \frac{(Ax_3(t) - Ax_4(t))\mathrm{sgn}(x_2(t)) - K_f x_2(t) - K_c(x_1(t)) - Mg}{M} \\ \frac{-kx_2(t)x_3(t)}{x_1(t) + \Delta} + \frac{kRT_s C_d C_0 wu(t)\hat{f}(x_3(t), P_s(t), P_e(t))}{A(x_1(t) + \Delta)} \\ \frac{kx_2(t)x_4(t)}{l - x_1(t) + \Delta} + \frac{kRT_s C_d C_0 wu(t)\hat{f}(x_4(t), P_s(t), P_e(t))}{A(l - x_1(t) + \Delta)} \end{bmatrix};$$

wherein A is the piston cross-sectional area of a rodless pneumatic cylinder, l is the total stroke of the rodless pneumatic cylinder, $\Delta$ is the small displacement of the piston movement of the rodless pneumatic cylinder, w is the width of the hole, $x_1(t)$ is the piston displacement of the rodless pneumatic cylinder, $x_2(t)$ is the speed of movement of the piston of the rodless pneumatic cylinder, $x_3(t)$ is the A chamber pressure of the rodless pneumatic cylinder, $x_4(t)$ is the B chamber pressure of the rodless pneumatic cylinder, $K_f$ is the coefficient of viscous friction, $K_c$ is the coefficient of Coulomb friction, M is the total load mass of the rodless pneumatic cylinder, $x(t)$ is the displacement of the piston of the rodless pneumatic cylinder, k is the specific heat constant, R is the ideal gas coefficient, $C_d$ is the displacement coefficient, $C_o$ is the mass flow rate parameter, $u(t)$ is the control input, $P_s(t)$ is the supply pressure, $P_e(t)$ is the external pressure, $T_s$ is supply temperature.

6. The automatic precise pneumatic plug tray seedling device according to claim 4, wherein the mathematical model equation for the first pneumatic valve is: $A_o(t)=KD_v(t)$, wherein $A_o(t)$ is the opening area of the first pneumatic valve, K is the gain value, and $D_v(t)$ is the displacement of the internal valve stem.

7. The automatic precise pneumatic plug tray seedling device according to claim 4, wherein the mass flow rate equation for the second pneumatic cylinder is:

$$\dot{m}(t) = \frac{C_d C_o A_o(t) P_u(t) \hat{f}\left(\frac{P_d(t)}{P_u(t)}\right)}{\sqrt{T_u}};$$

$$\hat{f}(P_a(t), P_s(t), P_e(t)) = \begin{cases} \frac{P_s(t)\hat{f}\left(\frac{P_a(t)}{P_s(t)}\right)}{\sqrt{T_s}} & A \text{ is the drive chamber} \\ \frac{P_a(t)\hat{f}\left(\frac{P_e(t)}{P_a(t)}\right)}{\sqrt{T_a}} & B \text{ is the drive chamber} \end{cases};$$

$$\hat{f}(P_b(t), P_s(t), P_e(t)) = \begin{cases} \frac{P_s(t)\hat{f}\left(\frac{P_b(t)}{P_s(t)}\right)}{\sqrt{T_s}} & B \text{ is the drive chamber} \\ \frac{P_b(t)\hat{f}\left(\frac{P_e(t)}{P_b(t)}\right)}{\sqrt{T_b}} & A \text{ is the drive chamber} \end{cases};$$

wherein $\dot{m}(t)$ is the mass flow rate, $C_d$ is the discharge coefficient, $C_o$ is the mass flow rate parameter, $A_o(t)$ is the opening area of the first pneumatic valve, $P_u(t)$ is the upper layer pressure, $P_d(t)$ is the lower layer pressure, $P_s(t)$ is the supply pressure, $P_e(t)$ is the external pressure, $P_a(t)$ and $P_b(t)$ are the pressure inside the chambers, $T_u$ is the upper layer temperature, and $T_s=T_a=T_b$ are supply air temperature and temperatures of chambers A and B.

8. The automatic precise pneumatic plug tray seedling device according to claim 4, wherein the fluid continuity equation for the second pneumatic cylinder is:

$$\dot{m}_a(t) = \frac{\dot{P}_a(t)V_a(t)}{kRT_s} + \frac{\dot{V}_a(t)P_a(t)}{RT_s};$$

$$\dot{m}_b(t) = \frac{\dot{P}_b(t)V_b(t)}{kRT_s} + \frac{\dot{V}_b(t)P_b(t)}{RT_s};$$

wherein $\dot{m}_a(t)$ and $\dot{m}_b(t)$ are the mass flow rates of chambers A and B, k is the specific heat constant, R is the ideal gas constant, $T_s$ is the supplied air temperature, $V_a(t)$ and, $V_b(t)$ are the volumes of chambers A and B, $P_a(t)$ and $P_b(t)$ are the pressure inside the chambers.

9. The automatic precise pneumatic plug tray seedling device according to claim 4, wherein the motion equation for the second pneumatic cylinder is:

$$(AP_a(t) - AP_b(t))\text{sgn}(x(t)) - K_f\dot{x}(t) - K_c(x(t))\text{sgn}(\dot{x}(t), P_a(t), P_b(t)) - Mg = M\ddot{x}(t);$$

wherein A is the piston cross-sectional area, $P_a(t)$, $P_b(t)$ are the pressure inside the chamber, $K_f$ is the coefficient of viscous friction, $K_c$ is the coefficient of Coulomb friction, $x(t)$ is displacements of the pneumatic cylinder, Mg is the piston load of the pneumatic cylinder.

10. The automatic precise pneumatic plug tray seedling device according to claim 1, wherein the equation for the input control is:

$$u(t) = \frac{-\widehat{W}_F^T z_F(t) - e(t) - a_1 D^\mu e(t) - a_2 \ddot{e}(t) - p_{21}e(t) - p_{22}D^\mu e(t) + \ddot{y}_m(t) - \frac{s}{2\rho^2}}{\widehat{W}_G^T z_G(t)}$$

wherein $\widehat{W}_F$, $\widehat{W}_G$ are the weight matrices, $z_F(t)$, $z_G(t)$ are orthogonal functions, T is transpose, $e(t)$ is the trajectory tracking error, $a_1$ and $a_2$ are sliding plane parameters, $p_{21}$ and $p_{22}$ are elements, $\ddot{y}_m(t)$ is the reference trajectory, $\rho$ is a natural number, and s is the fractional order sliding plane.

* * * * *